(12) United States Patent
Wang et al.

(10) Patent No.: US 11,778,200 B2
(45) Date of Patent: Oct. 3, 2023

(54) CONSTRAINTS ON REFERENCE PICTURE INFORMATION

(71) Applicant: Bytedance Inc., Los Angeles, CA (US)

(72) Inventors: Ye-kui Wang, San Diego, CA (US); Li Zhang, San Diego, CA (US)

(73) Assignee: BYTEDANCE INC., Los Angeles, CA (US)

(*) Notice: Subject to any disclaimer, the term of this patent is extended or adjusted under 35 U.S.C. 154(b) by 0 days.

(21) Appl. No.: 17/989,409

(22) Filed: Nov. 17, 2022

(65) Prior Publication Data

US 2023/0084006 A1    Mar. 16, 2023

Related U.S. Application Data

(63) Continuation of application No. PCT/US2021/033340, filed on May 20, 2021.
(Continued)

(51) Int. Cl.
*H04N 19/157* (2014.01)
*H04N 19/103* (2014.01)
(Continued)

(52) U.S. Cl.
CPC ......... *H04N 19/157* (2014.11); *H04N 19/103* (2014.11); *H04N 19/105* (2014.11);
(Continued)

(58) Field of Classification Search
CPC .. H04N 19/157; H04N 19/103; H04N 19/105; H04N 19/136; H04N 19/172;
(Continued)

(56) References Cited

U.S. PATENT DOCUMENTS 9,131,245 B2    9/2015  Chen
2013/0182755 A1  7/2013  Chen et al.
(Continued)

FOREIGN PATENT DOCUMENTS

EP      3020202 B1      9/2019
WO    2014028867 A2     2/2014
(Continued)

OTHER PUBLICATIONS

"Series H: Audiovisual and Multimedia Systems Infrastructure of audiovisual services—Coding of moving video High efficiency video coding," ITU-T and ISO/IEC, "High efficiency video coding", Rec. ITU-T H.265 | ISO/IEC 23008-2 (in force edition), Nov. 2019, 712 pages.
(Continued)

*Primary Examiner* — Nam D Pham
(74) *Attorney, Agent, or Firm* — Conley Rose, P.C.

(57) ABSTRACT

Examples of video encoding methods and apparatus and video decoding methods and apparatus are described. An example method of video processing includes performing a conversion between a video comprising a video picture comprising a slice and a bitstream of the video according to a rule. The rule specifies that a default value of a syntax element specifying a number of entries in a reference picture list syntax structure associated with a reference picture list (RPL) index is equal to 0 due to a condition being satisfied. The condition is satisfied in case (1) the video picture is an instantaneous decoding refresh picture, (2) a first syntax flag specifies that RPL syntax elements are not present in a slice header of the slice, and (3) a second syntax flag specifies that RPL information is not present in a picture header of the video picture.

20 Claims, 14 Drawing Sheets

Related U.S. Application Data

(60) Provisional application No. 63/028,150, filed on May 21, 2020.

(51) Int. Cl.
  *H04N 19/136* (2014.01)
  *H04N 19/174* (2014.01)
  *H04N 19/70* (2014.01)
  *H04N 19/105* (2014.01)
  *H04N 19/172* (2014.01)

(52) U.S. Cl.
  CPC ......... *H04N 19/136* (2014.11); *H04N 19/172* (2014.11); *H04N 19/174* (2014.11); *H04N 19/70* (2014.11)

(58) Field of Classification Search
  CPC ...... H04N 19/174; H04N 19/70; H04N 19/30; H04N 19/58; H04N 19/159; H04N 19/107; H04N 19/423
  See application file for complete search history.

(56) References Cited

U.S. PATENT DOCUMENTS

| | | | |
|---|---|---|---|
| 2013/0243081 | A1 | 9/2013 | Chen et al. |
| 2014/0003535 | A1 | 1/2014 | Haque et al. |
| 2014/0192896 | A1 | 7/2014 | Wang et al. |
| 2014/0219346 | A1 | 8/2014 | Ugur et al. |
| 2015/0023405 | A1 | 1/2015 | Joshi et al. |
| 2015/0103904 | A1 | 4/2015 | Rapaka et al. |
| 2016/0065982 | A1 | 3/2016 | Cho et al. |
| 2016/0198169 | A1 | 7/2016 | Lee et al. |
| 2016/0227232 | A1 | 8/2016 | Choi et al. |
| 2017/0238001 | A1 | 8/2017 | Li et al. |
| 2018/0288421 | A1 | 10/2018 | Lee et al. |
| 2019/0306494 | A1 | 10/2019 | Chang et al. |
| 2021/0329303 | A1 | 10/2021 | Deshpande |
| 2022/0038685 | A1* | 2/2022 | Deshpande ............ H04N 19/58 |
| 2023/0037902 | A1 | 2/2023 | Fuente |
| 2023/0043130 | A1 | 2/2023 | Fuente |

FOREIGN PATENT DOCUMENTS

| | | |
|---|---|---|
| WO | 2020056168 A1 | 3/2020 |
| WO | 2020084473 A1 | 4/2020 |
| WO | 2021045659 A2 | 3/2021 |

OTHER PUBLICATIONS

Document: JVET-G1001-v1, Chen, J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.

Document: JVET-R2001-vA, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 524 pages.

Document: JVET-Q2002-v3, Chen, J., et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.

VTM software, Retrieved from the internet: https://vcgit.hhi.fraunhofer.de/jvet/VVCSoftware_VTM.git, Feb. 8, 2023, pages.

Document: JVET-S0109-v2, Heng, B., et al., "AHG9: Signalling of picture rate," Joint Video Experts Team (JVET) of ITU-T SG 16 WP 3 and ISO/IEC JTC 1/SC 29/WG 11 19th Meeting: by teleconference, Jun. 22-Jul. 1, 2020, 6 pages.

Zhao, S., et al., "RTP Payload Format for Versatile Video Coding." draft-ietf-avtcore-rtp-wc-00, Feb. 25, 2020, 23 pages.

Foreign Communication From A Related Counterpart Application, PCT Application No. PCT/US2021/033340, International Search Report dated Oct. 20, 2021, 14 pages.

Foreign Communication From A Related Counterpart Application, PCT Application No. PCT/US2021/033351, International Search Report dated Aug. 24, 2021, 16 pages.

Foreign Communication From A Related Counterpart Application, PCT Application No. PCT/US2021/033360, International Search Report dated Oct. 1, 2021, 51 pages.

Foreign Communication From A Related Counterpart Application, PCT Application No. PCT/US2021/033967, International Search Report dated Sep. 27, 2021, 20 pages.

Foreign Communication From A Related Counterpart Application, Indian Application No. 202227066705, Indian Office Action dated Feb. 9, 2023, 5 pages.

Non-Final Office Action dated Mar. 24, 2023, 15 pages, U.S. Appl. No. 17/990,273, filed Nov. 18, 2022.

Document: JVET-R0107-v2, Deshpande, S., et al., "AHG8/AHG9: On Temporal Sublayers Information," Joint Video Experts Team (JVET) of ITU-T SG 16 WP 3 and ISO/IEC JTC 1/SC 29/WG 11 18th Meeting: by teleconference, Apr. 15-24, 2020, 8 pages.

Document: JVET-P0128-v2, He, Y., "AHG8:Scalability—GDR," Joint Video Experts Team (JVET) of ITU-T SG 16 WP 3 and ISO/IEC JTC 1/SC 29/WG 11 16th Meeting: Geneva, CH, Oct. 1-11, 2019, 2 pages.

Document: JCTVC-V1007, "(SHVC) Test Model 11 (SHM11) Introduction and Encoder Description," Joint Collaborative Team on Video Coding (JCT-VC) of ITU-T SG 16 WP 3 and ISO/IEC JTC 1/SC 29/WG 11 22nd Meeting: Geneva, CH, Oct. 15-21, 2015, 15 pages.

Document: JVET-S0159-v1, Wang, Y.K., et al., "AHG9: Reference picture list (RPL) cleanups," Joint Video Experts Team (JVET) of ITU-T SG 16 WP 3 and ISO/IEC JTC 1/SC 29/WG 11 19th Meeting: by teleconference, Jun. 22-Jul. 1, 2020, 3 pages.

Foreign Communication From A Related Counterpart Application, European Application No. 21807781.6, Extended European Search Report dated Jun. 5, 2023, 11 pages.

* cited by examiner

910 — Performing a conversion between a video picture of a video and a bitstream of the video according to a rule that specifies a constraint related to (1) whether the video picture is an instantaneous decoding refresh picture, (2) whether reference picture list (RPL) syntax elements are present in slice headers of slices of the video picture, (3) whether each picture referring to a picture parameter set of the video picture has more than one Network Abstraction Layer unit that do not have a same value of unit type, and (4) whether RPL information is present in a picture header of the video picture

CONSTRAINTS ON REFERENCE PICTURE INFORMATION

CROSS REFERENCE TO RELATED APPLICATIONS

This application is a continuation of International Patent Application No. PCT/US2021/033340, filed on May 20, 2021, which claims the priority to and benefits of U.S. Provisional Patent Application No. 63/028,150, filed on May 21, 2020. All the aforementioned patent applications are hereby incorporated by reference in their entireties.

TECHNICAL FIELD

The present disclosure relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present disclosure discloses embodiments that can be used by video encoders and decoders to perform video encoding or decoding.

In one example aspect, a method of processing video data is disclosed. The method includes performing a conversion between a video comprising a video picture comprising a slice and a bitstream of the video according to a rule. The rule specifies that a default value of a syntax element specifying a number of entries in a reference picture list syntax structure associated with a reference picture list (RPL) index is equal to 0 due to a condition being satisfied, wherein the condition is satisfied in case (1) the video picture is an instantaneous decoding refresh picture, (2) a first syntax flag specifies that RPL syntax elements are not present in a slice header of the slice, and (3) a second syntax flag specifies that RPL information is not present in a picture header of the video picture.

In another example aspect, a method of processing video data is disclosed. The method includes performing a conversion between a video picture of a video and a bitstream of the video according to a rule. The rule specifies that a value of a first syntax flag specifying whether reference picture list (RPL) syntax elements are present in slice headers of slices of the video picture is determined based on usage of an inter-layer prediction for the conversion.

In another example aspect, a method of processing video data is disclosed. The method includes performing a conversion between a video picture of a video and a bitstream of the video according to a rule. The rule specifies a constraint related to (1) whether the video picture is an instantaneous decoding refresh picture, (2) whether reference picture list (RPL) syntax elements are present in slice headers of slices of the video picture, (3) whether each picture referring to a picture parameter set of the video picture has more than one Network Abstraction Layer unit that do not have a same value of unit type, and (4) whether RPL information is present in a picture header of the video picture.

In another example aspect, a method of processing video data is disclosed. The method includes performing a conversion between a video picture of a video and a bitstream of the video according to a rule. The rule specifies a constraint related to (1) whether a layer uses an inter-layer prediction and (2) whether an entry in a reference picture list syntax structure is an inter-layer reference picture (ILRP) entry.

In another example aspect, a method of processing video data is disclosed. The method includes performing a conversion between a video picture of a video and a bitstream of the video according to a rule. The rule specifies that a variable specifying an index of a reference picture list syntax structure is inferred in case a number of reference picture list syntax structures of a first list in a sequence parameter set is 1 and a first reference picture list of the video picture is derived based on the reference picture list syntax structures of the first list.

In another example aspect, a method of processing video data is disclosed. The method includes performing a conversion between a current picture of a video and a bitstream of the video according to a rule. The rule specifies that responsive to a picture being referred to by an inter-layer reference picture (ILRP) entry in a reference picture list of a slice of the current picture, the picture is allowed to have a gradual decoding refresh (GDR) type and a syntax element specifying a recovery point of the picture in an output order is 0.

In another example aspect, a method of processing video data is disclosed. The method includes performing a conversion between a video comprising a current picture and a bitstream of the video according to a rule. The rule specifies that, responsive to the current picture being a starting picture of a coded layer video sequence, each inter-layer reference picture (ILRP) entry in a reference picture list of the current picture is marked as used for long-term reference.

In another example aspect, a method of processing video data is disclosed. The method includes performing a conversion between a video and a bitstream of the video according to a rule. The rule specifies that a first syntax flag specifying whether reference picture list syntax elements are present in slice headers of instantaneous decoding refresh (IDR) pictures is present in the bitstream before a second syntax flag specifying whether an inter-layer reference picture (ILRP) is used for inter prediction of any coded picture in a coded layer video sequence.

In another example aspect, a video processing method is disclosed. The method includes performing a conversion between a video comprising one or more video layers comprising one or more video pictures and a coded representation of the video, wherein the coded representation conforms to a format rule, wherein the format rule specifies that a first value of a first syntax element indicating whether an inter-layer reference picture is used for the conversion controls a second value or presence of a second syntax element indicative of whether a reference picture list is included in the coded representation.

In another example aspect, another video processing method is disclosed. The method includes performing a conversion between a video comprising one or more video layers comprising one or more video pictures and a coded representation of the video, wherein the coded representation conforms to a format rule, wherein the format rule specifies that use of instantaneous decoder reference pictures type network abstraction layer units is disabled in the coded representation in case that a first syntax element indicates that a syntax element for a reference picture list is not included in the coded representation and mixed network abstraction layer units are allowed in the coded representation and a reference picture list syntax element is not included in a picture header.

In another example aspect, another video processing method is disclosed. The method includes performing a conversion between a video comprising one or more video layers comprising one or more video pictures and a coded representation of the video, wherein the coded representation conforms to a format rule, wherein the format rule specifies a constraint that: (a) a value of a first syntax element indicative of an independent layer activation flag for a given layer id in a video parameter set controls a value of a second syntax element indicative of activation on inter layer reference pictures, or (b) a value of a first syntax element indicative of a number of reference picture lists in a sequence parameter set controls a value of a second syntax element indicative of a reference picture list used for conversion of a current video unit.

In another example aspect, another video processing method is disclosed. The method includes performing a conversion between a video comprising one or more video layers comprising one or more video pictures and a coded representation of the video, wherein the conversion is according to a rule that specifies that an inter-layer picture in a reference list for the current picture is considered to be a long-term reference picture in case that the current picture is a starting picture of a coded layer video sequence.

In another example aspect, another video processing method is disclosed. The method includes performing a conversion between a video comprising one or more video layers comprising one or more video pictures and a coded representation of the video, wherein the coded representation conforms to a format rule that specifies that a first field indicative of presence of reference picture list information is signalled before a second field signalling presence of inter-layer pictures that is conditionally signalled according to first field.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclosed. The code embodies one of the methods described herein in the form of processor-executable code.

These, and other, features are described throughout the present disclosure.

BRIEF DESCRIPTION OF DRAWINGS

FIG. 9 is a flowchart representation of another method for video processing in accordance with one or more embodiments of the present disclosure.

DETAILED DESCRIPTION

Figure 1:
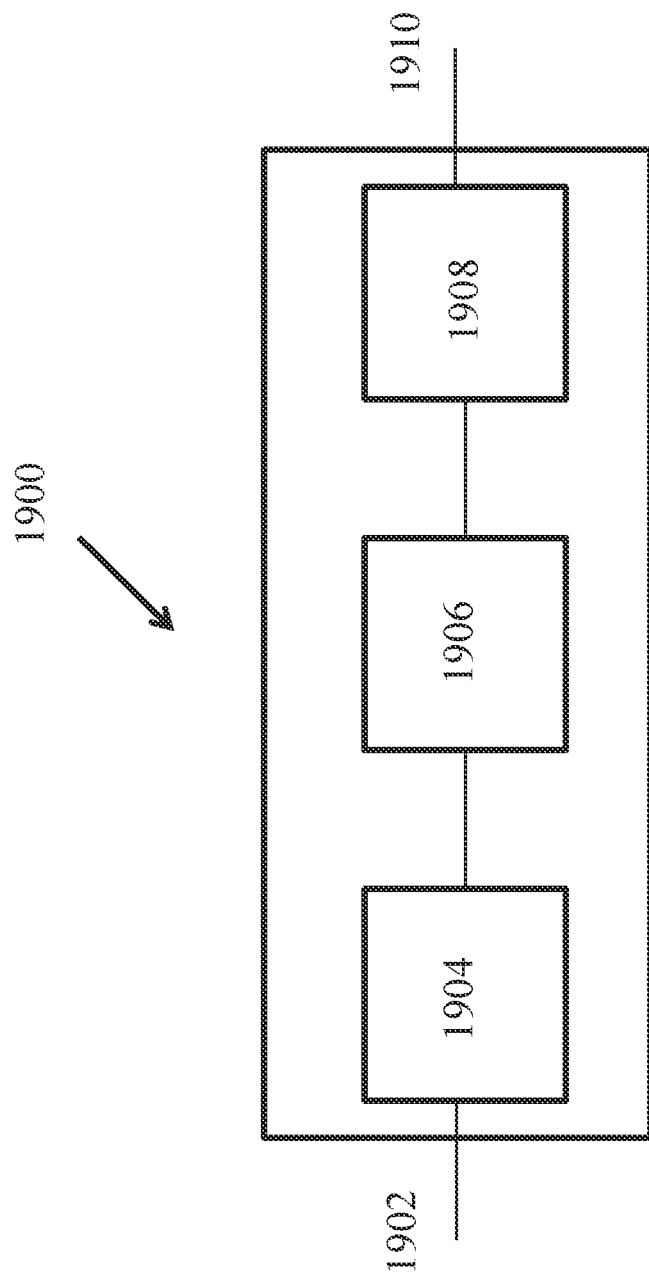
FIG. 1 is a block diagram that illustrates a video coding system in accordance with some embodiments of the present disclosure.

Section headings are used in the present disclosure for ease of understanding and do not limit the applicability of embodiments disclosed in each section only to that section. Furthermore, H.266 terminology is used in some description only for ease of understanding and not for limiting scope of the disclosed embodiments. As such, the embodiments described herein are applicable to other video codec protocols and designs also.

1. Overview

The present disclosure is related to video coding technologies. Specifically, it is about some improvements on the design of reference picture lists. The ideas may be applied individually or in various combination, to any video coding standard or non-standard video codec that supports multi-layer video coding, e.g., the being-developed Versatile Video Coding (VVC).

2. Abbreviations

APS Adaptation Parameter Set
AU Access Unit
AUD Access Unit Delimiter
AVC Advanced Video Coding
CLVS Coded Layer Video Sequence
CLVSS CLVS Start
CPB Coded Picture Buffer
CRA Clean Random Access
CTU Coding Tree Unit
CVS Coded Video Sequence
DCI Decoding Capability Information
DPB Decoded Picture Buffer
EOB End Of Bitstream
EOS End Of Sequence
GDR Gradual Decoding Refresh
HEVC High Efficiency Video Coding HRD Hypothetical Reference Decoder
IDR Instantaneous Decoding Refresh
ILP Inter-Layer Prediction
ILRP Inter-Layer Reference Picture
JEM Joint Exploration Model
LTRP Long-Term Reference Picture
MCTS Motion-Constrained Tile Sets
NAL Network Abstraction Layer
OLS Output Layer Set
PH Picture Header
PPS Picture Parameter Set
PTL Profile, Tier and Level
PU Picture Unit
RADL Random Access Decodable Leading
RAP Random Access Point
RB SP Raw Byte Sequence Payload
SH Slice Header
SEI Supplemental Enhancement Information
SPS Sequence Parameter Set
STRP Short-Term Reference Picture
SVC Scalable Video Coding
VCL Video Coding Layer
VPS Video Parameter Set
VTM VVC Test Model
VUI Video Usability Information
VVC Versatile Video Coding

3. Initial Discussion

Video coding standards have evolved primarily through the development of the well-known International Telecommunication Union (ITU) Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (WET) was founded by Video Coding Experts Group (VCEG) and MPEG jointly in 2015. Since then, many new methods have been adopted by JVET and put into the reference software named Joint Exploration Model (JEM). The JVET meeting is concurrently held once every quarter, and the new coding standard is targeting a 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion (FDIS) at the July 2020 meeting.

3.1. Reference Picture Management and Reference Picture Lists (RPLs)

Reference picture management is a core functionality that is necessary for any video coding scheme that uses inter prediction. It manages the storage and removal of reference pictures into and from a decoded picture buffer (DPB) and puts reference pictures in their proper order in the RPLs.

The reference picture management of HEVC, including reference picture marking and removal from the decoded picture buffer (DPB) as well as reference picture list construction (RPLC), differs from that of AVC. Instead of the reference picture marking mechanism based on a sliding window plus adaptive memory management control operation (MMCO) in AVC, HEVC specifies a reference picture management and marking mechanism based on so-called reference picture set (RPS), and the RPLC is consequently based on the RPS mechanism. An RPS consists of a set of reference pictures associated with a picture, consisting of all reference pictures that are prior to the associated picture in decoding order, that may be used for inter prediction of the associated picture or any picture following the associated picture in decoding order. The reference picture set consists of five lists of reference pictures. The first three lists contain all reference pictures that may be used in inter prediction of the current picture and that may be used in inter prediction of one or more of the pictures following the current picture in decoding order. The other two lists consist of all reference pictures that are not used in inter prediction of the current picture but may be used in inter prediction of one or more of the pictures following the current picture in decoding order. RPS provides an "intra-coded" signalling of the DPB status, instead of an "inter-coded" signalling as in AVC, mainly for improved error resilience. The RPLC process in HEVC is based on the RPS, by signalling an index to an RPS subset for each reference index; this process is simpler than the RPLC process in AVC.

Reference picture management in VVC is more similar to HEVC than AVC, but is somewhat simpler and more robust. As in those standards, two RPLs, list 0 and list 1, are derived, but they are not based on the reference picture set concept used in HEVC or the automatic sliding window process used in AVC; instead they are signalled more directly. Reference pictures are listed for the RPLs as either active and inactive entries, and only the active entries may be used as reference indices in inter prediction of CTUs of the current picture. Inactive entries indicate other pictures to be held in the DPB for referencing by other pictures that arrive later in the bitstream.

3.2. Random Access and its Supports in HEVC and VVC

Random access refers to starting access and decoding of a bitstream from a picture that is not the first picture of the bitstream in decoding order. To support tuning in and channel switching in broadcast/multicast and multiparty video conferencing, seeking in local playback and streaming, as well as stream adaptation in streaming, the bitstream needs to include frequent random access points, which are typically intra coded pictures but may also be inter-coded pictures (e.g., in the case of gradual decoding refresh).

HEVC includes signalling of intra random access points (TRAP) pictures in the NAL unit header, through NAL unit types. Three types of TRAP pictures are supported, namely instantaneous decoder refresh (IDR), clean random access (CRA), and broken link access (BLA) pictures. IDR pictures are constraining the inter-picture prediction structure to not reference any picture before the current group-of-pictures (GOP), conventionally referred to as closed-GOP random access points. CRA pictures are less restrictive by allowing certain pictures to reference pictures before the current GOP, all of which are discarded in case of a random access. CRA pictures are conventionally referred to as open-GOP random access points. BLA pictures usually originate from splicing of two bitstreams or part thereof at a CRA picture, e.g., during stream switching. To enable better systems usage of TRAP pictures, altogether six different NAL units are defined to signal the properties of the TRAP pictures, which can be used to better match the stream access point types as defined in the ISO base media file format (ISOBMFF), which are utilized for random access support in dynamic adaptive streaming over HTTP (DASH).

VVC supports three types of TRAP pictures, two types of IDR pictures (one type with or the other type without associated RADL pictures), and one type of CRA picture. These are basically the same as in HEVC. The BLA picture types in HEVC are not included in VVC, mainly due to two reasons: i) The basic functionality of BLA pictures can be realized by CRA pictures plus the end of sequence NAL unit, the presence of which indicates that the subsequent picture starts a new CVS in a single-layer bitstream. ii) There was a desire in specifying less NAL unit types than HEVC during the development of VVC, as indicated by the use of five instead of six bits for the NAL unit type field in the NAL unit header.

Another key difference in random access support between VVC and HEVC is the support of GDR in a more normative manner in VVC. In GDR, the decoding of a bitstream can start from an inter-coded picture and although at the beginning not the entire picture region can be correctly decoded but after a number of pictures the entire picture region would be correct. AVC and HEVC also support GDR, using the recovery point SEI message for signalling of GDR random access points and the recovery points. In VVC, a new NAL unit type is specified for indication of GDR pictures and the recovery point is signalled in the picture header syntax structure. A CVS and a bitstream are allowed to start with a GDR picture. This means that it is allowed for an entire bitstream to contain only inter-coded pictures without a single intra-coded picture. The main benefit of specifying GDR support this way is to provide a conforming behavior for GDR. GDR enables encoders to smooth the bit rate of a bitstream by distributing intra-coded slices or blocks in multiple pictures as opposed intra coding entire pictures, thus allowing significant end-to-end delay reduction, which is considered more important nowadays than before as ultralow delay applications like wireless display, online gaming, drone based applications become more popular.

Another GDR-related feature in VVC is the virtual boundary signalling. The boundary between the refreshed region (i.e., the correctly decoded region) and the unrefreshed region at a picture between a GDR picture and its recovery point can be signalled as a virtual boundary, and when signalled, in-loop filtering across the boundary would not be applied, thus a decoding mismatch for some samples at or near the boundary would not occur. This can be useful when the application determines to display the correctly decoded regions during the GDR process.

TRAP pictures and GDR pictures can be collectively referred to as random access point (RAP) pictures.

3.3. Parameter Sets

AVC, HEVC, and VVC specify parameter sets. The types of parameter sets include SPS, PPS, APS, and VPS. SPS and PPS are supported in all of AVC, HEVC, and VVC. VPS was introduced since HEVC and is included in both HEVC and VVC. APS was not included in AVC or HEVC but is included in the latest VVC draft text.

SPS was designed to carry sequence-level header information, and PPS was designed to carry infrequently changing picture-level header information. With SPS and PPS, infrequently changing information need not to be repeated for each sequence or picture, hence redundant signalling of this information can be avoided. Furthermore, the use of SPS and PPS enables out-of-band transmission of the important header information, thus not only avoiding the need for redundant transmissions but also improving error resilience.

VPS was introduced for carrying sequence-level header information that is common for all layers in multi-layer bitstreams.

APS was introduced for carrying such picture-level or slice-level information that needs quite some bits to code, can be shared by multiple pictures, and in a sequence there can be quite many different variations.

3.4. Scalable Video Coding (SVC) in General and in VVC

Scalable video coding (SVC, sometimes also referred to as scalability in video coding) refers to video coding in which a base layer (BL), sometimes referred to as a reference layer (RL), and one or more scalable enhancement layers (ELs) are used. In SVC, the base layer can carry video data with a base level of quality. The one or more enhancement layers can carry additional video data to support, for example, higher spatial, temporal, and/or signal-to-noise (SNR) levels. Enhancement layers may be defined relative to a previously encoded layer. For example, a bottom layer may serve as a BL, while a top layer may serve as an EL. Middle layers may serve as either ELs or RLs, or both. For example, a middle layer (e.g., a layer that is neither the lowest layer nor the highest layer) may be an EL for the layers below the middle layer, such as the base layer or any intervening enhancement layers, and at the same time serve as a RL for one or more enhancement layers above the middle layer. Similarly, in the multiview or three-dimensional (3D) extension of the HEVC standard, there may be multiple views, and information of one view may be utilized to code (e.g., encode or decode) the information of another view (e.g., motion estimation, motion vector prediction and/or other redundancies).

In SVC, the parameters used by the encoder or the decoder are grouped into parameter sets based on the coding level (e.g., video-level, sequence-level, picture-level, slice level, etc.) in which they may be utilized. For example, parameters that may be utilized by one or more coded video sequences of different layers in the bitstream may be included in a video parameter set (VP S), and parameters that are utilized by one or more pictures in a coded video sequence may be included in a sequence parameter set (SPS). Similarly, parameters that are utilized by one or more slices in a picture may be included in a picture parameter set (PPS), and other parameters that are specific to a single slice may be included in a slice header. Similarly, the indication of which parameter set(s) a particular layer is using at a given time may be provided at various coding levels.

Thanks to the support of reference picture resampling (RPR) in VVC, support of a bitstream containing multiple layers, e.g., two layers with standard definition (SD) and high definition (HD) resolutions in VVC can be designed without the need for any additional signal-processing-level coding tool, as upsampling needed for spatial scalability support can just use the RPR upsampling filter. Nevertheless, high-level syntax changes (compared to not supporting scalability) are needed for scalability support. Scalability support is specified in VVC version 1. Different from the scalability supports in any earlier video coding standards, including in extensions of AVC and HEVC, the design of VVC scalability has been made friendly to single-layer decoder designs as much as possible. The decoding capability for multi-layer bitstreams are specified in a manner as if there were only a single layer in the bitstream. For example, the decoding capability, such as DPB size, is specified in a manner that is independent of the number of layers in the bitstream to be decoded. Basically, a decoder designed for single-layer bitstreams does not need much change to be able to decode multi-layer bitstreams. Compared to the designs of multi-layer extensions of AVC and HEVC, the hypertext transfer protocol live streaming (HLS) aspects have been significantly simplified at the sacrifice of some flexibilities. For example, an TRAP AU is required to contain a picture for each of the layers present in the CVS.

4. Technical Problems Solved by Disclosed Technical Solutions

The existing design on reference picture lists in the latest VVC text (in JVET-R2001-vA/v10) has the following problems:

1) The flag sps_idr_rpl_present_flag was designed for single-layer bitstreams for merging of IDR and non-IDR pictures without the need of changing the SHs. In multi-layer contexts, when sps_inter_layer_ref_pics_present_flag is equal to 1, it does not make sense to have sps_idr_rpl_present_flag equal to 0 as that would disable IDR slices (i.e., slices with nal_unit_type equal to IDR_N_LP or IDR_W_RADL) in enhancement layer (EL) pictures to contain RPLs and consequently disable IDR slices in EL pictures to be coded using inter-layer prediction (ILP), while ILP of TRAP pictures often contributes most to the coding gain provided by scalability.
2) For a picture for which pps_mixed_nalus_inpic_flag is equal to 1, pps_rpl_info_inph_flag is equal 0, and there is at least one VCL NAL unit with nal_unit_type equal to IDR_W_RADL or IDR_N_LP, the value of sps_idr_rpl_present_flag has to be equal to 1 such that the IDR slices in the picture would have RPLs signalled in the SHs, otherwise the RPLs derived for the IDR slices in the picture would be empty, while the RPLs derived for the non-IDR slices in the picture are not empty.
3) When vps_independent_layer_flag[GeneralLayerIdx[nuh_layer_id]] is equal to 0, if sps_inter_layer_ref_pics_present_flag is equal to 0, the non-independent layer with nuh_layer_id equal to the nuh_layer_id of the SPS would have to refer to an SPS with a lower nuh_layer_id. Although that's possible, however, in that case there is no reason to have such an SPS with that value of nuh_layer_id at all. Therefore, it makes sense to require sps_inter_layer_ref_pics_present_flag to be equal to 1 when vps_independent_layer_flag[GeneralLayerIdx[nuh_layer_id]] is equal to 0.
4) The inference of rpl_idx[0] when sps_num_refpic_lists[0] is equal to 1 and rpl_sps_flag[0] is equal to 1 is missing while it is needed.
5) Clause 8.3.2 (Decoding process for reference picture lists construction) of the latest VVC text includes the specification of the default values for RplsIdx[i], num_ref_entries[i][RplsIdx[i]], and NumRefIdxActive[i] for slices with sps_idr_rpl_present_flag equal to 0 and nal_unit_type is equal to IDR_W_RADL or IDR_N_LP, as those values would be used while for such slices the RPLs are empty. However, when pps_rpl_info_inph_flag is equal to 1, the PH includes RPLs hence there is no need to specify the default values for the above variables and syntax elements when pps_rpl_info_inph_flag is equal to 1. In fact, when pps_rpl_info_inph_flag is equal to 1, the RPLs may be not empty, thus such specification of the default values can be incorrect.
6) Clause 8.3.2 (Decoding process for reference picture lists construction) of the latest VVC text includes the following constraint:
    The picture referred to by each ILRP entry in RefPicList[0] or RefPicList[1] of a slice of the current picture shall be present in the DPB, shall have nuh_layer_id refPicLayerId less than the nuh_layer_id of the current picture, and shall either be an TRAP picture or have TemporalId less than or equal to Max(0, vps_max_tid_refpics_plus1[currLayerIdx][refLayerIdx]−1), where currLayerIdx and refLayerIdx are equal to GeneralLayerIdx[nuh_layer_id] and GeneralLayerIdx[refpicLayerId], respectively.
    However, a GDR picture with ph_recovery_poc_cnt equal to 0 should also be considered in the constraint, similarly as an TRAP picture.
7) In the decoding process for reference picture marking, as specified in clause 8.3.3 of the latest VVC text, inter-layer reference pictures referred to by a CLVSS picture, if any, are not marked as "used for long-term reference". That would cause problems in the decoding process, as this would trigger some POC based scaling to be applied, which can cause a division by zero operation to be invocated as the POC values of an IRLP and the current picture are the same.

5. Examples of Technical Solutions and Embodiments

To solve the above problems, and others, methods as summarized below are disclosed. The items should be considered as examples to explain the general concepts and should not be interpreted in a narrow way. Furthermore, these items can be applied individually or combined in any manner.

1) To solve problem 1, sps_idr_rpl_present_flag is conditionally signalled according to sps_inter_layer_ref_pics_present_flag.
    a. In one example, specify that, when sps_inter_layer_ref_pics_present_flag is equal to 1, sps_idr_rpl_present_flag is skipped and inferred to be equal to 1.
        i. Alternatively, in addition, require the value of sps_idr_rpl_present_flag to be equal to 1 when vps_independent_layer_flag[GeneralLayerIdx[nuh_layer_id]] is equal to 0.
    b. Alternatively, sps_idr_rpl_present_flag is not conditionally signalled according to sps_inter_layer_ref_pics_present_flag, require the value of sps_idr_rpl_present_flag to be equal to 1 when sps_inter_layer_ref_pics_present_flag is equal to 1.
    c. Alternatively, sps_idr_rpl_present_flag is not conditionally signalled according to sps_inter_layer_ref_pics_present_flag, require the value of sps_idr_rpl_present_flag to be equal to 1 when vps_independent_layer_flag[GeneralLayerIdx[nuh_layer_id]] is equal to 0.

d. Alternatively, sps_idr_rpl_present_flag is not conditionally signalled according to sps_inter_layer_ref_pics_present_flag, require the value of sps_idr_rpl_present_flag to be equal to 1 when sps_inter_layer_ref_pics_present_flag is equal to 1 or vps_independent_layer_flag[GeneralLayerIdx[nuh_layer_id]] is equal to 0.
2) To solve problem 2, add a constraint such that when sps_idr_rpl_present_flag is equal to 0, pps_mixed_nalus_inpic_flag is equal to 1, and pps_rpl_info_inph_flag is equal to 0, the value of nal_unit_type shall not be equal to IDR_W_RADL or IDR_N_LP.
   a. Alternatively, add a constraint such that the value of sps_idr_rpl_present_flag shall be equal to 1 for pictures for which pps_mixed_nalus_inpic_flag is equal to 1, pps_rpl_info_inph_flag is equal 0, and there is at least one VCL NAL unit with nal_unit_type equal to IDR_W_RADL or IDR_N_LP.
3) To solve problem 3, add a constraint such that when vps_independent_layer_flag[GeneralLayerIdx[nuh_layer_id]] is equal to 0, the value of sps_inter_layer_ref_pics_present_flag shall be equal to 1.
   a. Alternatively, it is specified that value of sps_inter_layer_ref_pics_present_flag shall be equal to !vps_independent_layer_flag[GeneralLayerIdx[nuh_layer_id]].
4) To solve problem 4, add the inference of the value of rpl_idx[0] when sps_num_ref_pic_lists[0] is equal to 1 and rpl_sps_flag[0] is equal to 1.
   a. In one example, the value of rpl_idx[0] is inferred to be equal to 0 when sps_num_ref_pic_lists[0] is equal to 1 and rpl_sps_flag[0] is equal to 1.
5) To solve problem 5, specify that, only when pps_rpl_info_in_ph_flag is equal to 0, set or infer the default values for RplsIdx[i], num_ref_entries[i][RplsIdx[i]], and NumRefIdxActive[i] for slices with sps_idr_rpl_present_flag equal to 0 and nal_unit_type is equal to IDR_W_RADL or IDR_N_LP.
6) To solve problem 6, treat a GDR picture with ph_recovery_poc_cnt equal to 0 in the same manner as an IRAP picture regarding constraints on an ILRP entry in RefPicList[0] or RefPicList[1] of a slice of the current picture.
7) To solve problem 7, in the decoding process for reference picture marking, specify that, when the current picture is a CLVSS picture, mark each ILRP entry, when present, in RefPicList[0] or RefPicList[1], as "used for long-term reference".
8) To solve problem 1, in the SPS syntax sps_idr_rpl_present_flag is signalled before sps_inter_layer_ref_pics_present_flag, and sps_inter_layer_ref_pics_present_flag is conditionally signalled according to sps_idr_rpl_present_flag.
   a. In one example, specify that, when sps_idr_rpl_present_flag is equal to 0, sps_inter_layer_ref_pics_present_flag is skipped and inferred to be equal to 0.
      i. Alternatively, in addition, require vps_independent_layer_flag[GeneralLayerIdx[nuh_layer_id]] is equal to 1 when the value of sps_idr_rpl_present_flag to be equal to 0.
   b. Alternatively, in the SPS syntax sps_idr_rpl_present_ flag is signalled before sps_inter_layer_ref_pics_present_flag, sps_inter_layer_ref_pics_present_flag is not conditionally signalled according to sps_idr_rpl_present_flag, require sps_inter_layer_ref_pics_present_flag to be equal to 0 when the value of sps_idr_rpl_present_flag is equal to 0.
   c. Alternatively, in the SPS syntax sps_idr_rpl_present_flag is signalled before sps_inter_layer_ref_pics_present_flag, sps_inter_layer_ref_pics_present_flag is not conditionally signalled according to sps_idr_rpl_present_flag, require the value of sps_inter_layer_ref_pics_present_flag to be equal to 0 or vps_independent_layer_flag[GeneralLayerIdx[nuh_layer_id]] to be equal to 1 when sps_idr_rpl_present_flag is equal to 0.
   d. Alternatively, whether to and/or how to signal sps_inter_layer_ref_pics_present_flag and/or sps_idr_rpl_present_flag may depend on a general constraint flag present in general constraint information (GCI) syntax, e.g., intra only constraint flag.

6. Embodiments

Below are some example embodiments for some of the invention aspects summarized above in Section 4, which can be applied to the VVC specification. Most relevant parts that have been added or modified are underlined in boldface italics, and some of the deleted parts are indicated using double square brackets (e.g., [[ ]]).

6.1. First Embodiment

This embodiment is for items 1, 1.a, 2, 2a, 3, 4, 4.a, 5, 6, and 7.

7.3.2.3 Sequence Parameter Set RBSP Syntax

|  | Descriptor |
| --- | --- |
| seq_parameter_set_rbsp( ) { | |
| ... | |
| if( sps_video_parameter_set_id > 0 ) | |
| sps_inter_layer_ref_pics_present_flag | u(1) |
| *if( !sps_inter_layer_ref_pics_present_flag )* | |
| sps_idr_rpl_present_flag | u(1) |
| ... | |
| } | |

7.4.2.2 NAL Unit Header Semantics

...

The value of nal_unittype shall be the same for all VCL NAL units of a subpicture. A subpicture is referred to as having the same NAL unit type as the VCL NAL units of the subpicture.

When sps_idr_rpl_present_flag is equal to 0, pps_mixed_nalus_in_pic_flag is equal to 1, and pps_rpl_info_in_ph_flag is equal 0, nal_unit_type shall not be equal to IDR_W_RADL or IDR_N_LP.

When any two subpictures in a picture have different NAL unit types, the value of sps_subpic_treated_as_pic_flag[ ] shall be equal to 1 for all subpictures in the picture that contain at least one P or B slice.

7.4.3.3 Sequence Parameter Set RBSP Semantics sps_inter_layer_ref_pics_present_flag equal to 0 specifies that no ILRP is used for inter prediction of any coded picture in the CLVS. sps_inter_layer_ref_pics_present_flag equal to 1 specifies that ILRPs may be used for inter prediction of one or more coded pictures in the CLVS. When sps_video_parameter_set_id is equal to 0, the value of sps_inter_layer_ref_pics_present_flag is inferred to be equal to 0. [[When vps_independent_layer_flag[GeneralLayerIdx[nuh_layer_id]] is equal to 1, the value of sps_inter_layer_ref_pics_present_flag shall be equal to 0.]] The value of sps_inter_layer_ref_pics_present_flag shall be equal to !vps_independent_layer_flag[GeneralLayerIdx[nuh_layer_id]].

sps_idr_rpl_present_flag equal to 1 specifies that reference picture list syntax elements may be present in slice headers of IDR pictures. sps_idr_rpl_present_flag equal to 0 specifies that reference picture list syntax elements are not present in slice headers of IDR pictures. When not present, the value of sps_idr_rpl_present_flag is inferred to be equal to 1. When vps_independent_layer_flag[GeneralLayerkixi nuh_layer_id Jf is equal to 0, the value of sps_idr_rpl_present_flag shall be equal to 1.

. . .

7.4.9 Reference Picture Lists Semantics

. . .

rpl_idx i] specifies the index, into the list of the refpic_list_struct(listIdx, rplsIdx) syntax structures with listIdx equal to i included in the SPS, of the refpic_list_struct (listIdx, rplsIdx) syntax structure with listIdx equal to i that is used for derivation of reference picture list i of the current picture. The syntax element rpl_idx[i] is represented by Ceil(Log2(sps_num_ref_pic_lists[i])) bits. The value of rpl_idx[i] shall be in the range of 0 to sps_num_ref_pic_lists [i]−1, inclusive.

When rpl_sps_flag[i] is equal to 1 and rpl_idx[i] is not present, the value of rpl_idx[i] is inferred as follows:
[[if rpl_sps_flag[i] is equal to 1]] If i is equal to 1 and pps_rpll_idx_present_flag is equal to 0, the value of rpl_idx[1] is inferred to be equal to rpl_idx[0].
Otherwise, the value of [[rpl_idx[1]]] rpl idxf i f is inferred to be equal to 0.
The variable RplsIdx[i] is derived as follows:

RplsIdx[*i*]=rpl_sps_flag[*i*]?rpl_idx[*i*]:sps_num_ref_pic_lists[*i*]   (150)

. . .

8.3.2 Decoding Process for Reference Picture Lists Construction

. . .

If sps_idr_rpl_present_flag is equal to 0, pps_rpl_info_in_ph_flag is equal to 0, and nal_unit_type is equal to IDRW_RADL or IDR_N_LP, the reference picture lists RefPicList[0] and RefPicList[1] are both derived to be empty, i.e., to contain 0 entries, and the following applies for each i equal to 0 or 1:
The value of RplsIdx[i] is set equal to sps_num_ref_pic_lists[i].
The value of num_ref_entries[i][RplsIdx[i]] is inferred to be equal to 0.
The value of NumRefIdxActive[i] is set equal to 0.

. . .

[[The picture referred to by each ILRP entry in RefPicList [0] or RefPicList[1] of a slice of the current picture shall be in the same AU as the current picture.]]
All of the following constraints apply for the picture referred to by each ILRP entry, when present, in RefPicList[0] or RefPicList[1] of a slice of the current picture:
The picture shall be in the same AU as the current picture.
The picture shall be present in the DPB.
The picture shall have nuh_layer_id refPicLayerId less than the nuh_layer_id of the current picture.
Either of the following constraints apply:
The picture shall be a GDR picture with ph_recovery_poc_cnt equal to 0 or an IRAP picture.
The picture shall have Temporalld less than or equal to Max(0, vps_max_tid_il_ref_pics_plus1[currLayerIdx][refLayerIdx]−1), where currLayerIdx and refLayerIdx are equal to GeneralLayerIdx [nuh_layer_id] and GeneralLayerIdx[refpicLayerId], respectively.
Each ILRP entry, when present, in RefPicList[0] or RefPicList[1] of a slice shall be an active entry.

. . .

8.3.3 Decoding Process for Reference Picture Marking

. . .

If the current picture is a CLVSS picture, the following applies:
All reference pictures currently in the DPB (if any) with the same nuh_layer_id as the current picture are marked as "unused for reference".
For each ILRP entry in RefPicList[0] or RefPkList[1], the picture is marked as "used for long-term reference".
Otherwise (the current picture is a not CLVSS picture), the following applies:
For each LTRP entry in RefPicList[0] or RefPicList[1], when the picture is an STRP with the same nuhlayer_id as the current picture, the picture is marked as "used for long-term reference".
Each reference picture with the same nuh_layer_id as the current picture in the DPB that is not referred to by any entry in RefPicList[0] or RefPicList[1] is marked as "unused for reference".
For each ILRP entry in RefPicList[0] or RefPicList[1], the picture is marked as "used for long-term reference".

FIG. 1 is a block diagram showing an example video processing system 1900 in which various embodiments disclosed herein may be implemented. Various implementations may include some or all of the components of the system 1900. The system 1900 may include input 1902 for receiving video content. The video content may be received in a raw or uncompressed format, e.g., 8- or 10-bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1900 may include a coding component 1904 that may implement the various coding or encoding methods described in the present disclosure. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or DisplayPort, and so on. Examples of storage interfaces include serial advanced technology attachment (SATA), peripheral component interface (PCI), integrated drive electronics (IDE) interface, and the like. The embodiments described in the present disclosure may be embodied in various electronic devices such as mobile phones, laptops, smartphones or other devices that are capable of performing digital data processing and/or video display.

Figure 2:
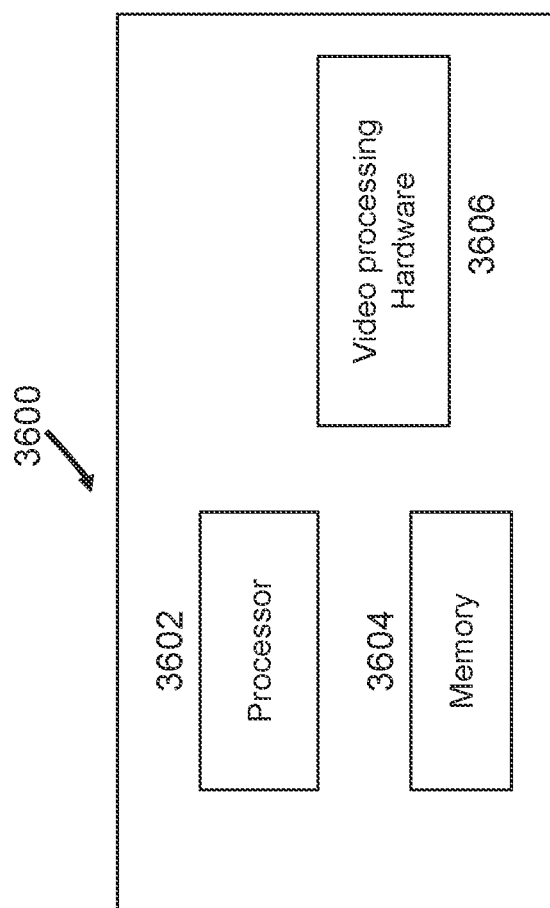
FIG. 2 is a block diagram of an example hardware platform used for video processing.

FIG. 2 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present disclosure. The memory (memories) 3604 may be used for storing data and code used for implementing the methods and embodiments described herein. The video processing hardware 3606 may be used to implement, in hardware circuitry, some embodiments described in the present disclosure.

Figure 4:
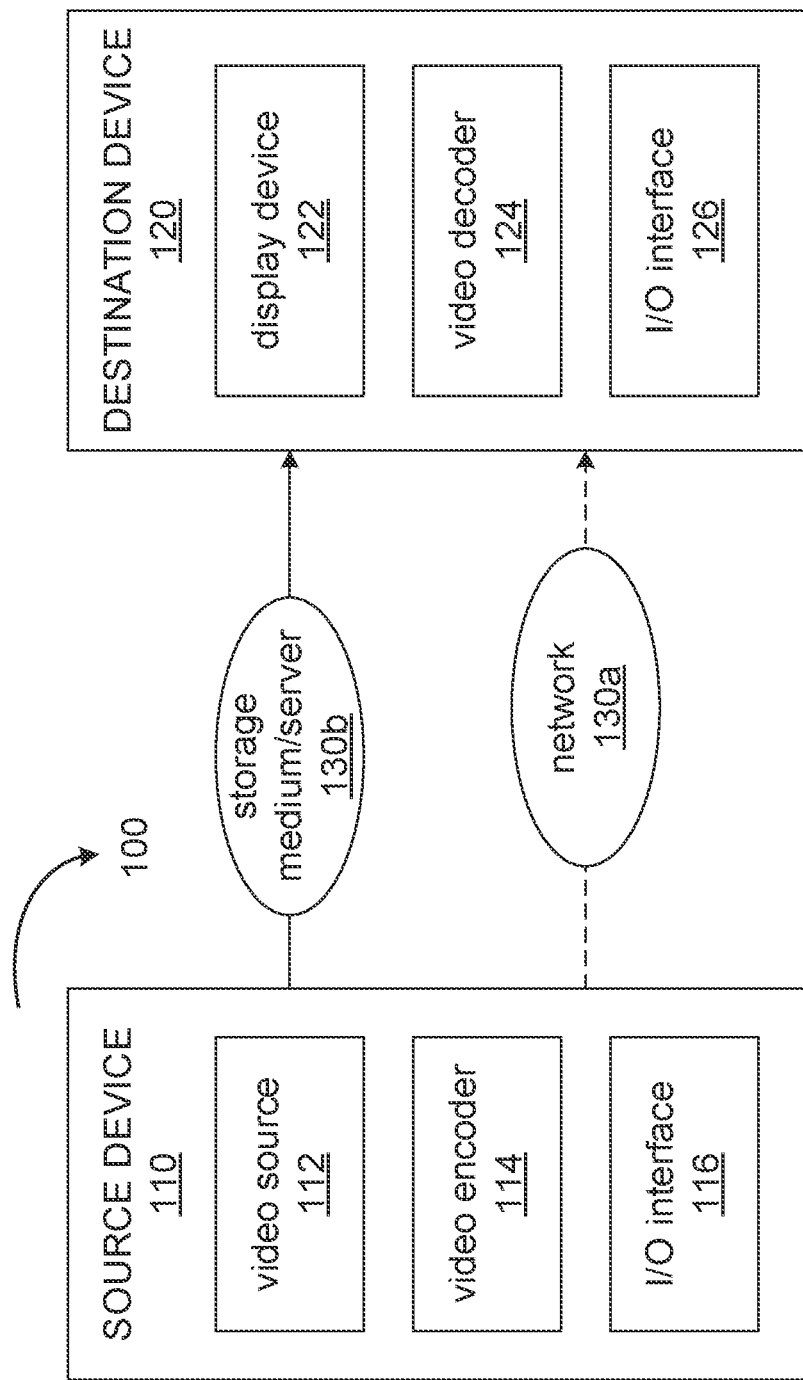
FIG. 4 is a block diagram that illustrates an example video coding system.

FIG. 4 is a block diagram that illustrates an example video coding system 100 that may utilize the embodiments of this disclosure.

As shown in FIG. 4, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 5:
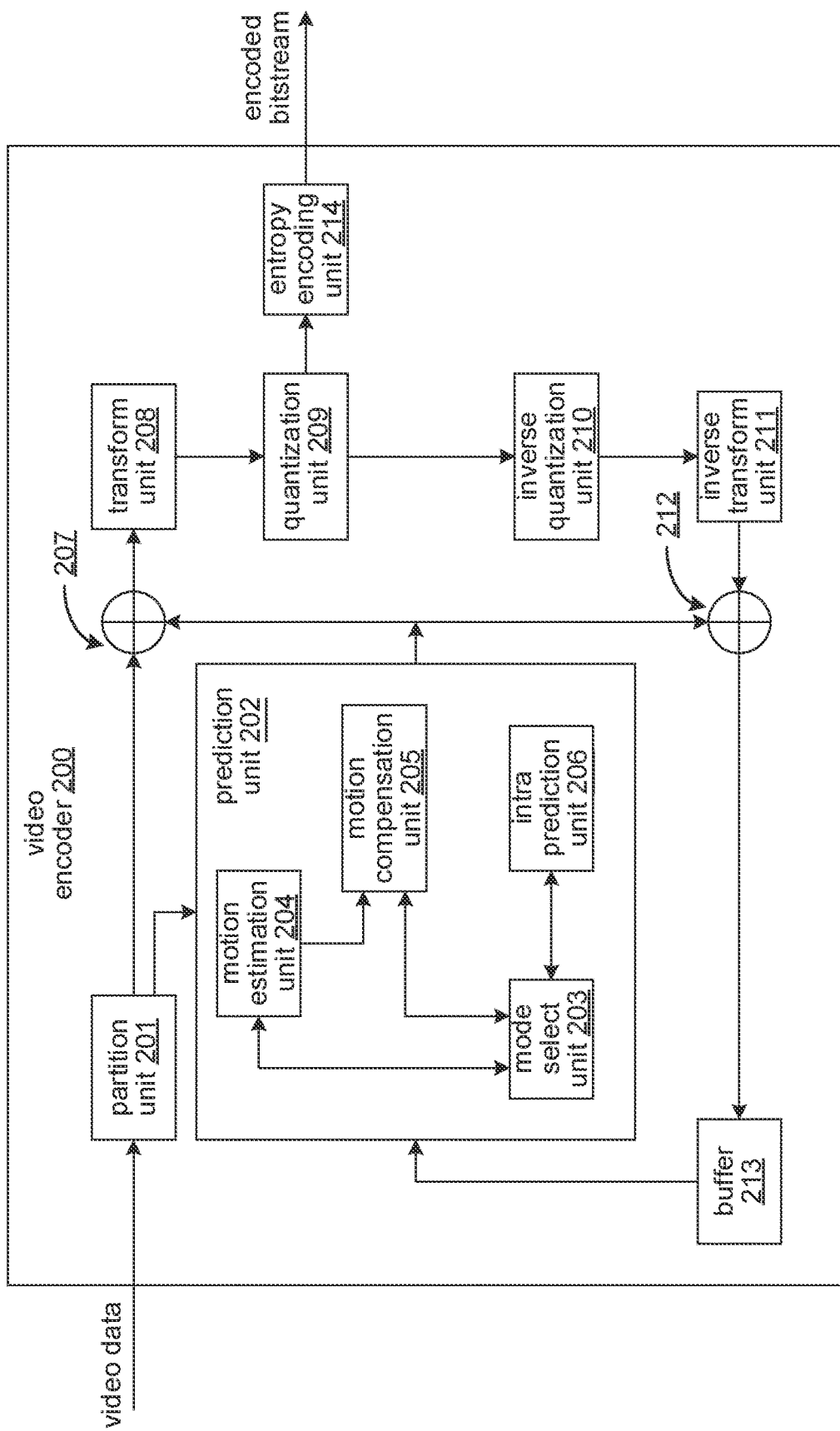
FIG. 5 is a block diagram that illustrates an encoder in accordance with some embodiments of the present disclosure.

FIG. 5 is a block diagram illustrating an example of video encoder 200, which may be video encoder 114 in the system 100 illustrated in FIG. 4.

Video encoder 200 may be configured to perform any or all of the embodiments of this disclosure. In the example of FIG. 5, video encoder 200 includes a plurality of functional components. The embodiments described in this disclosure may be shared among the various components of video encoder 200. In some examples, a processor may be configured to perform any or all of the embodiments described in this disclosure.

The functional components of video encoder 200 may include a partition unit 201, a prediction unit 202 which may include a mode select unit 203, a motion estimation unit 204, a motion compensation unit 205, and an intra prediction unit 206; a residual generation unit 207; a transform unit 208; a quantization unit 209; an inverse quantization unit 210; an inverse transform unit 211; a reconstruction unit 212; a buffer 213; and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 5 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some examples, mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signalling techniques that may be implemented by video encoder 200 include advanced motion vector prediction (AMVP) and merge mode signalling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed to reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 6:
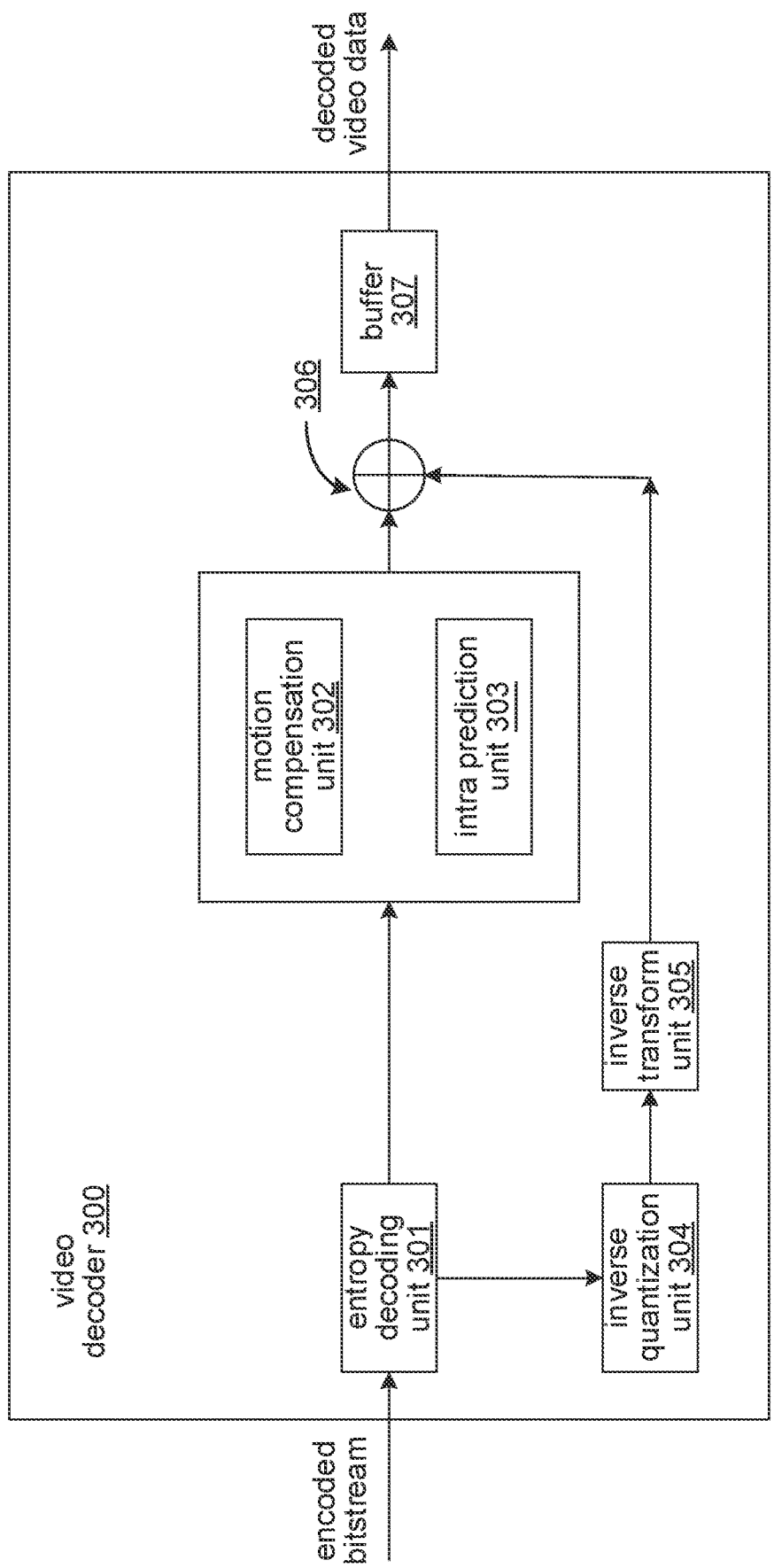
FIG. 6 is a block diagram that illustrates a decoder in accordance with some embodiments of the present disclosure.

FIG. 6 is a block diagram illustrating an example of video decoder 300 which may be video decoder 124 in the system 100 illustrated in FIG. 4.

The video decoder 300 may be configured to perform any or all of the embodiments of this disclosure. In the example of FIG. 6, the video decoder 300 includes a plurality of functional components. The embodiments described in this disclosure may be shared among the various components of the video decoder 300. In some examples, a processor may be configured to perform any or all of the embodiments described in this disclosure.

In the example of FIG. 6, video decoder 300 includes an entropy decoding unit 301, a motion compensation unit 302, an intra prediction unit 303, an inverse quantization unit 304, an inverse transformation unit 305, a reconstruction unit 306, and a buffer 307. Video decoder 300 may, in some examples, perform a decoding pass generally reciprocal to the encoding pass described with respect to video encoder 200 (FIG. 5).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 304 inverse quantizes, i.e., de-quantizes, the quantized video block coefficients provided in the bitstream and decoded by entropy decoding unit 301. Inverse transformation unit 305 applies an inverse transform.

Reconstruction unit 306 may sum the residual blocks with the corresponding prediction blocks generated by motion compensation unit 302 or intra prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

A listing of solutions preferred by some embodiments is provided next.

The following solutions show example embodiments discussed in the previous section (e.g., item 1).

Figure 3:
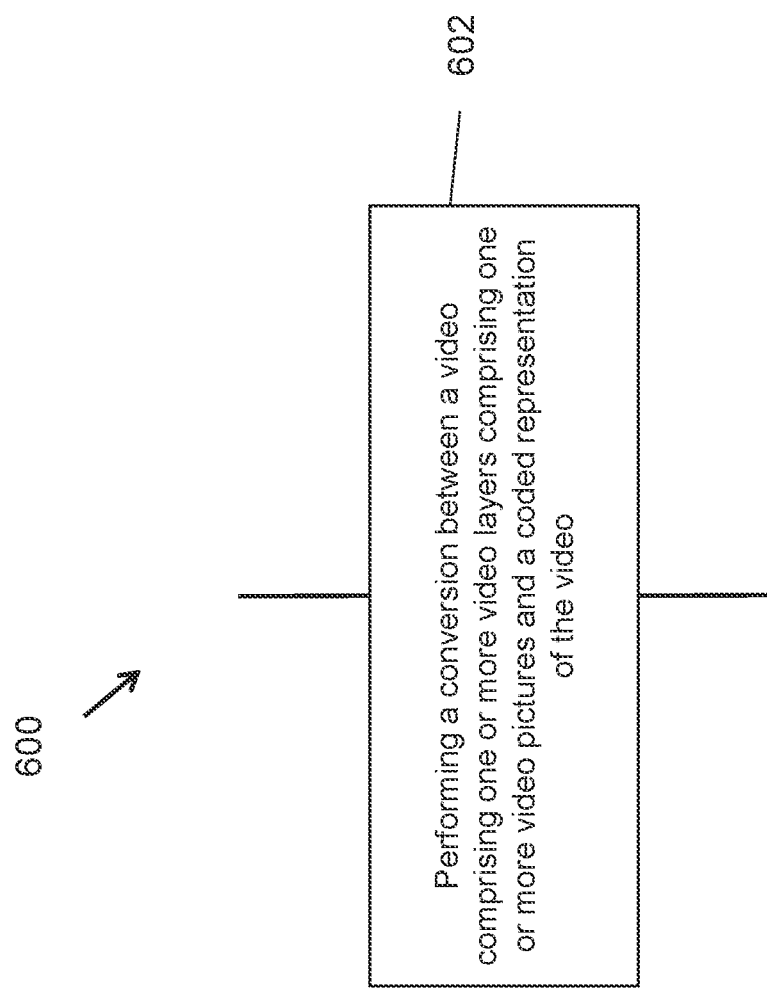
FIG. 3 is a flowchart for an example method of video processing.

1. A method of video processing (e.g., method 600 in FIG. 3), comprising performing (602) a conversion between a video comprising one or more video layers comprising one or more video pictures and a coded representation of the video, wherein the coded representation conforms to a format rule, wherein the format rule specifies that a first value of a first syntax element indicating whether an inter-layer reference picture is used for the conversion controls a second value or presence of a second syntax element indicative of whether a reference picture list is included in the coded representation.

2. The method of solution 1, wherein, in case that the first value is 1, then the second syntax element is omitted from the coded representation and is inferred to be 1.

The following solutions show example embodiments discussed in the previous section (e.g., item 2).

3. A video processing method, comprising: performing a conversion between a video comprising one or more video layers comprising one or more video pictures and a coded representation of the video, wherein the coded representation conforms to a format rule, wherein the format rule specifies that use of instantaneous decoder reference pictures type network abstraction layer units is disabled in the coded representation in case that a first syntax element indicates that a syntax element for a reference picture list is not included in the coded representation and mixed network abstraction layer units are allowed in the coded representation and a reference picture list syntax element is not included in a picture header.

The following solutions show example embodiments discussed in the previous section (e.g., items 3, 4).

4. A video processing method, comprising: performing a conversion between a video comprising one or more video layers comprising one or more video pictures and a coded representation of the video, wherein the coded representation conforms to a format rule, wherein the format rule specifies a constraint that: (a) a value of a first syntax element indicative of an independent layer activation flag for a given layer id in a video parameter set controls a value of a second syntax element indicative of activation on inter layer reference pictures, or (b) a value of a first syntax element indicative of a number of reference picture lists in a sequence parameter set controls a value of a second syntax element indicative of a reference picture list used for conversion of a current video unit.

5. The method of solution 4, wherein the first and second syntax elements have opposite binary values.

6. The method of solution 4, wherein the first and second syntax elements have a same binary value.

The following solutions show example embodiments discussed in the previous section (e.g., item 7).

7. A video processing method, comprising: performing a conversion between a video comprising one or more video layers comprising one or more video pictures and a coded representation of the video, wherein the conversion is according to a rule that specifies that an inter-layer picture in a reference list for the current picture is considered to be a long-term reference picture in case that the current picture is a starting picture of a coded layer video sequence.

The following solutions show example embodiments discussed in the previous section (e.g., item 8).

8. A video processing method, comprising: performing a conversion between a video comprising one or more video layers comprising one or more video pictures and a coded representation of the video, wherein the coded representation conforms to a format rule that specifies that a first field indicative of presence of reference picture list information is signalled before a second field signalling presence of inter-layer pictures that is conditionally signalled according to first field.

9. The method of any of solutions 1-8, wherein performing the conversion comprising encoding the video to generate the coded representation.

10. The method of any of solutions 1-8, wherein performing the conversion comprises parsing and decoding the coded representation to generate the video.

11. A video decoding apparatus comprising a processor configured to implement a method recited in one or more of solutions 1 to 10.

12. A video encoding apparatus comprising a processor configured to implement a method recited in one or more of solutions 1 to 10.

13. A computer program product having computer code stored thereon, the code, when executed by a processor, causes the processor to implement a method recited in any of solutions 1 to 10.

14. A method, apparatus or system described in the present disclosure.

Figure 7:
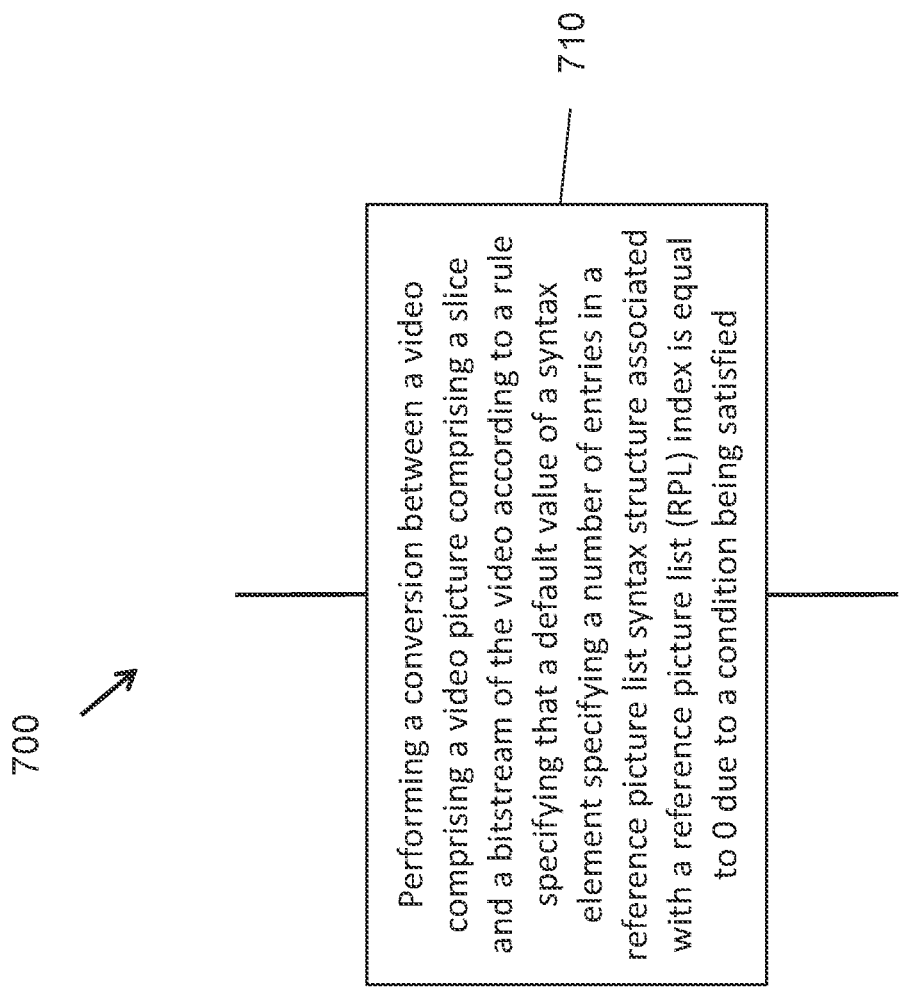
FIG. 7 is a flowchart representation of a method for video processing in accordance with one or more embodiments of the present disclosure.

FIG. 7 is a flowchart representation of a method 700 of processing video data in accordance with one or more embodiments of the present disclosure. The method 700 includes, at operation 710, performing a conversion between a video comprising a video picture comprising a slice and a bitstream of the video according to a rule. The rule specifies that a default value of a syntax element specifying a number of entries in a reference picture list syntax structure associated with a reference picture list (RPL) index is equal to 0 due to a condition being satisfied. The condition is satisfied in case (1) the video picture is an instantaneous decoding refresh picture, (2) a first syntax flag specifies that RPL syntax elements are not present in a slice header of the slice, and (3) a second syntax flag specifies that RPL information is not present in a picture header of the video picture.

In some embodiments, a default value of a variable is equal to 0 in response to the condition being satisfied. The variable specifies a maximum reference index of an RPL for the conversion of the slice. In some embodiments, a variable indicating a reference picture list index is equal to a number of reference picture lists syntax structures in a sequence parameter set in response to the condition being satisfied.

Figure 8:
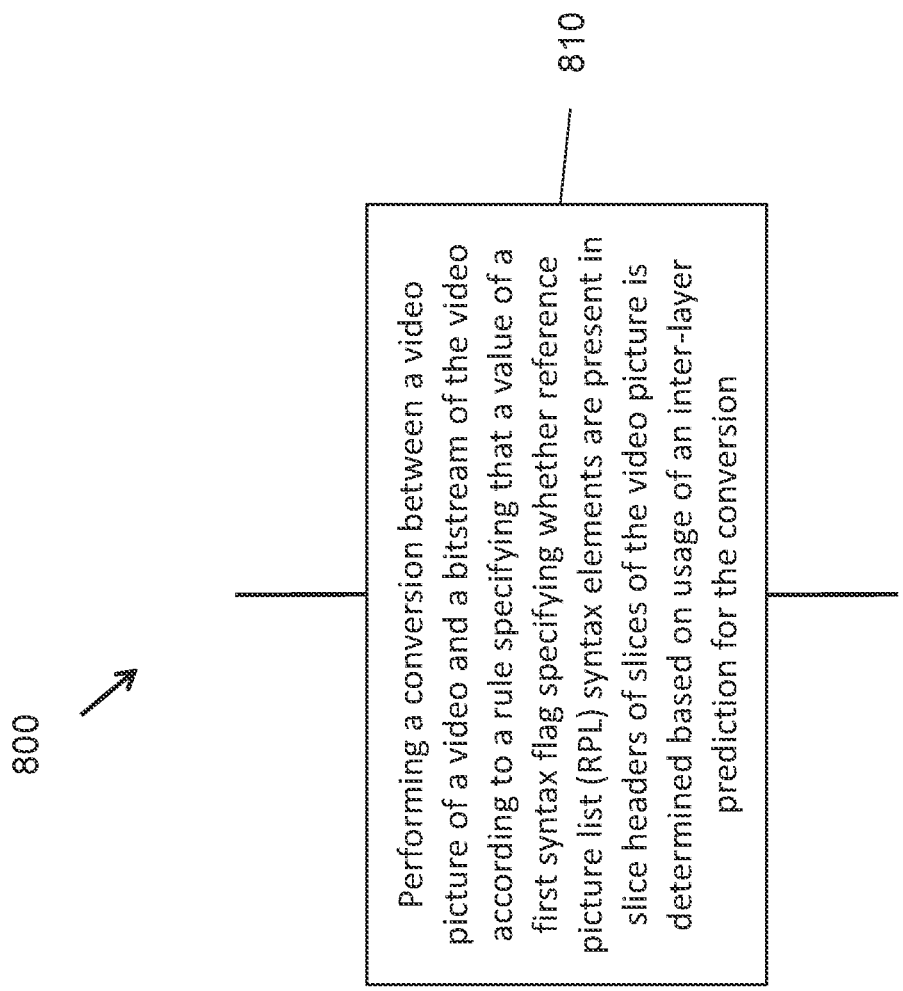
FIG. 8 is a flowchart representation of another method for video processing in accordance with one or more embodiments of the present disclosure.

FIG. 8 is a flowchart representation of a method 800 of processing video data in accordance with one or more embodiments of the present disclosure. The method 800 includes, at operation 810, performing a conversion between a video picture of a video and a bitstream of the video according to a rule. The rule specifies that a value of a first syntax flag specifying whether reference picture list (RPL) syntax elements are present in slice headers of slices of the video picture is determined based on usage of an inter-layer prediction for the conversion.

In some embodiments, the first syntax flag is conditionally present in the bitstream based on a second syntax flag specifying whether an entry in a reference picture list syntax structure is an inter-layer reference picture (ILRP) entry. In some embodiments, the first syntax flag is not present in the bitstream and inferred to be equal to 1 in case the second syntax flag indicates that an entry in the reference picture list syntax structure is an inter-layer reference picture (ILRP) entry.

In some embodiments, the value of the first syntax flag is equal to 1 in case a second syntax flag specifies that an entry in a reference picture list syntax structure is an inter-layer reference picture (ILRP) entry. In some embodiments, the value of the first syntax element is equal to 1 in case a third syntax flag has a value of 0 indicating that a layer does not use the inter-layer prediction. In some embodiments, the value of the first syntax flag is equal to 1 in case (1) a second syntax flag specifies that an entry in a reference picture list syntax structure is an inter-layer reference picture (ILRP) entry, or (2) a third syntax flag has a value of 0 indicating that a layer does not use the inter-layer prediction.

FIG. 9 is a flowchart representation of a method 900 of processing video data in accordance with one or more embodiments of the present disclosure. The method 900 includes, at operation 910, performing a conversion between a video picture of a video and a bitstream of the video according to a rule. The rule specifies a constraint related to (1) whether the video picture is an instantaneous decoding refresh picture, (2) whether reference picture list (RPL) syntax elements are present in slice headers of slices of the video picture, (3) whether each picture referring to a picture parameter set of the video picture has more than one network abstraction layer unit that do not have a same value of unit type, and (4) whether RPL information is present in a picture header of the video picture.

In some embodiments, the constraint specifies that the video picture is constrained to be a non-instantaneous decoding refresh picture in case (1) the RPL syntax elements are not present in the slice headers of the slices of the video picture, (2) each picture referring to the picture parameter set has more than one network abstraction layer unit that do not have the same value of unit type, and (3) the RPL information is not present in the picture header of the video picture. In some embodiments, the constraint specifies that the RPL syntax elements are constrained to be present in the slice headers of the slices of the video picture in case (1) each picture referring to the picture parameter set has more than one network abstraction layer unit that do not have the same value of unit type, (2) the RPL information is present in the picture header of the video picture, and (3) the video picture is an instantaneous decoding refresh picture.

Figure 10:
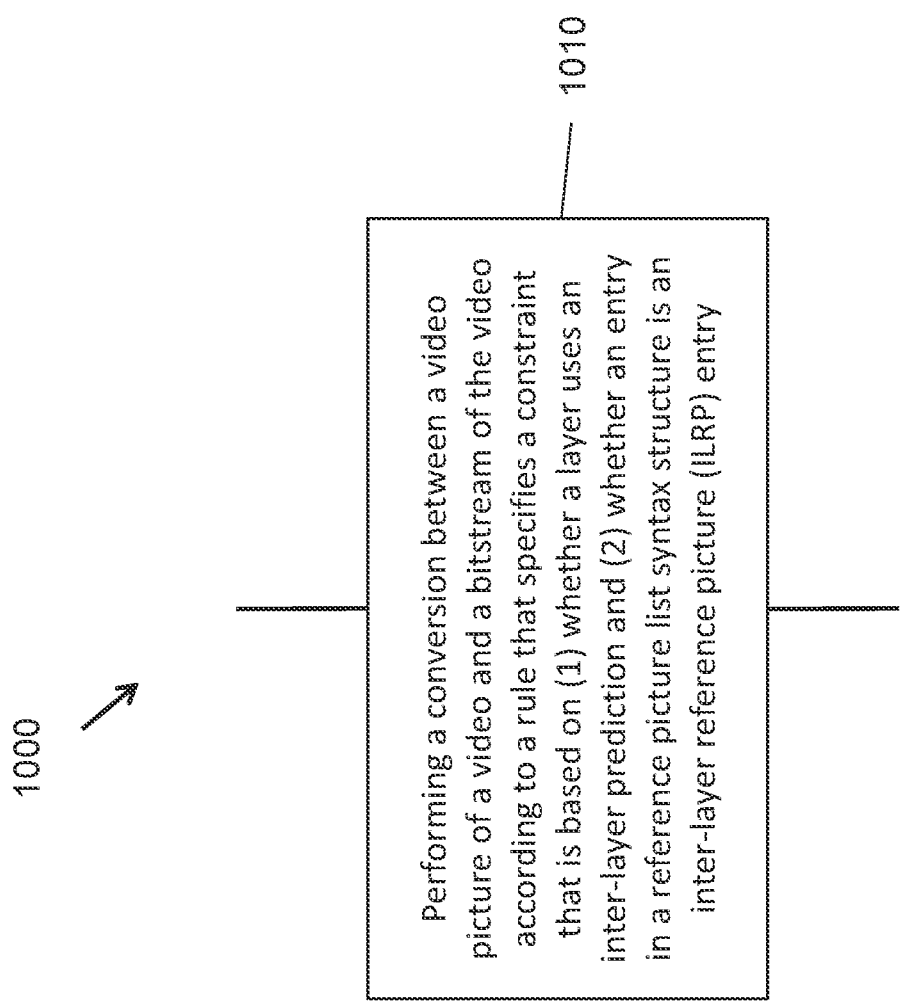
FIG. 10 is a flowchart representation of another method for video processing in accordance with one or more embodiments of the present disclosure.

FIG. 10 is a flowchart representation of a method 1000 of processing video data in accordance with one or more embodiments of the present disclosure. The method 1000 includes, at operation 1010, performing a conversion between a video picture of a video and a bitstream of the video according to a rule. The rule specifies a constraint that is based on (1) whether a layer uses an inter-layer prediction and (2) whether an entry in a reference picture list syntax structure is an inter-layer reference picture (ILRP) entry.

In some embodiments, the constraint specifies that an entry in the reference picture list syntax structure is an inter-layer reference picture (ILRP) entry in case no layer uses the inter-layer prediction. In some embodiments, the constraint specifies that whether an entry in a reference picture list syntax structure is an inter-layer reference picture (ILRP) entry is same as whether a layer uses the inter-layer prediction.

Figure 11:
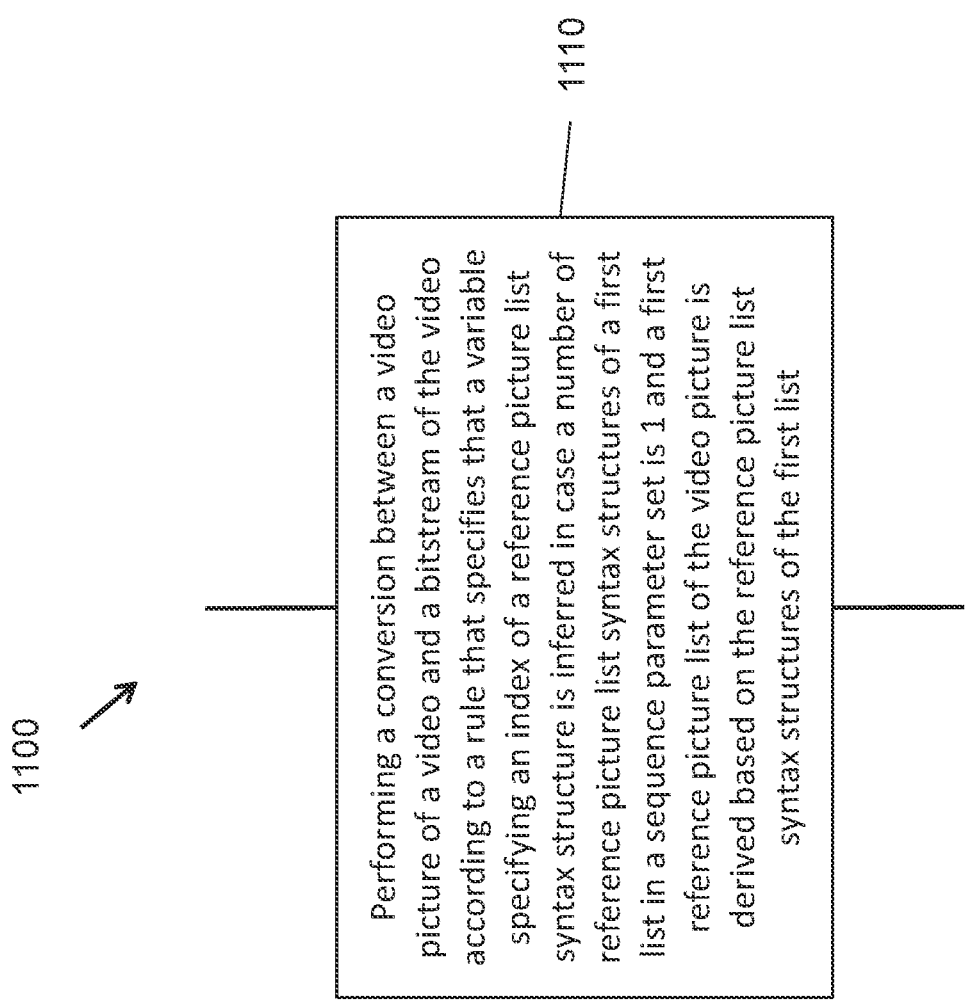
FIG. 11 is a flowchart representation of another method for video processing in accordance with one or more embodiments of the present disclosure.

FIG. 11 is a flowchart representation of a method 1100 of processing video data in accordance with one or more embodiments of the present disclosure. The method 1100 includes, at operation 1110, performing a conversion between a video picture of a video and a bitstream of the video according to a rule. The rule specifies that a variable specifying an index of a reference picture list syntax structure is inferred in case a number of reference picture list syntax structures of a first list in a sequence parameter set is 1 and a first reference picture list of the video picture is derived based on the reference picture list syntax structures of the first list. In some embodiments, the variable is inferred to be equal to 0.

Figure 12:
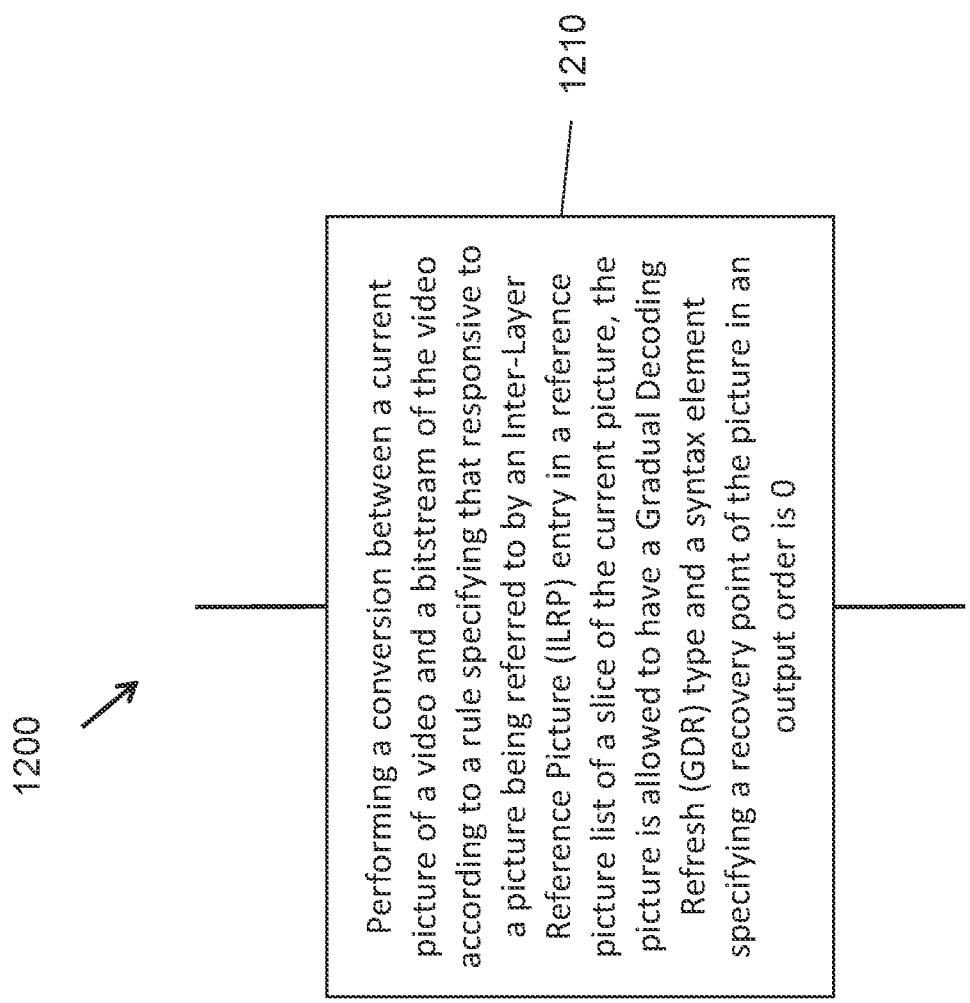
FIG. 12 is a flowchart representation of another method for video processing in accordance with one or more embodiments of the present disclosure.

FIG. 12 is a flowchart representation of a method 1200 of processing video data in accordance with one or more embodiments of the present disclosure. The method 1200 includes, at operation 1210, performing a conversion between a current picture of a video and a bitstream of the video according to a rule. The rule specifies that responsive to a picture being referred to by an inter-layer reference picture (ILRP) entry in a reference picture list of a slice of the current picture, the picture is allowed to have a gradual decoding refresh (GDR) type and a syntax element specifying a recovery point of the picture in an output order is 0.

In some embodiments, the picture is in a same access unit as the current picture. In some embodiments, the picture is present in a decoded picture buffer. In some embodiments, the picture has a layer identifier that is smaller than a layer identifier of the current picture. In some embodiments, the reference picture list comprises a reference list 0 or a reference list 1.

Figure 13:
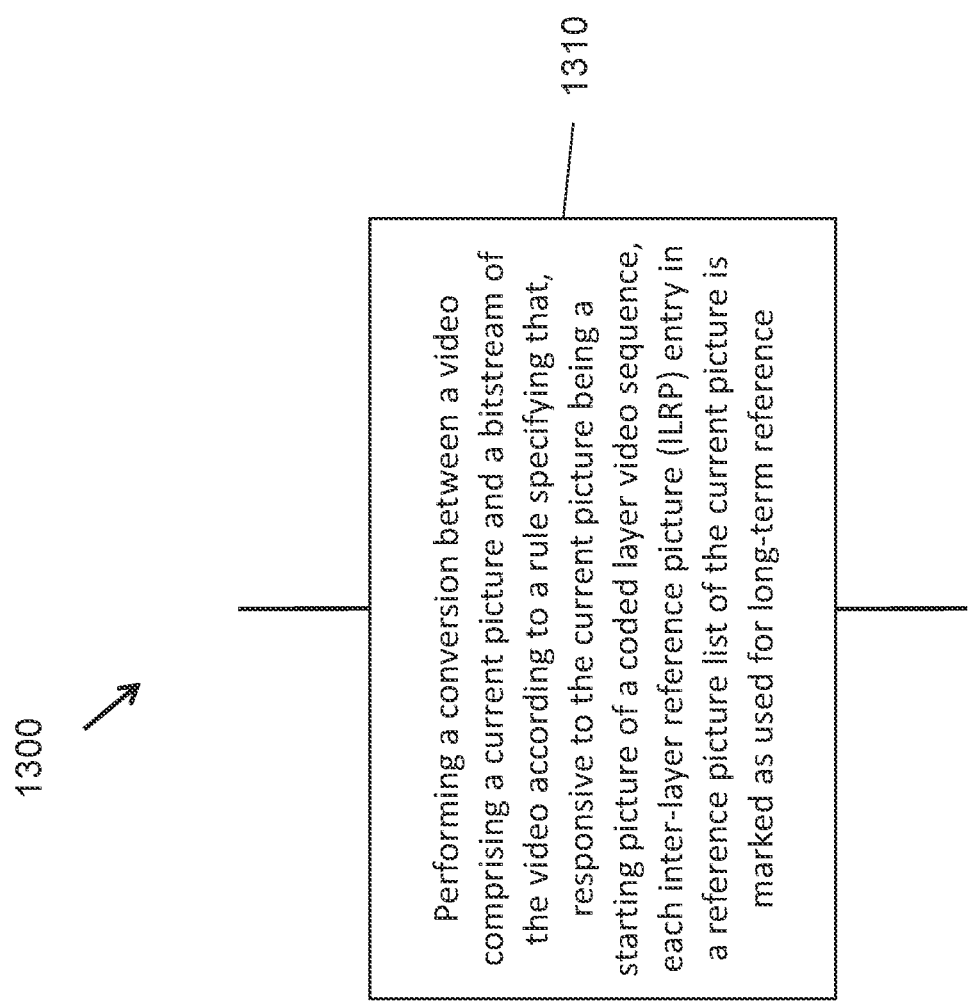
FIG. 13 is a flowchart representation of another method for video processing in accordance with one or more embodiments of the present disclosure.

FIG. 13 is a flowchart representation of a method 1300 of processing video data in accordance with one or more embodiments of the present disclosure. The method 1300 includes, at operation 1310, performing a conversion between a video comprising a current picture and a bitstream of the video according to a rule. The rule specifies that, responsive to the current picture being a starting picture of a coded layer video sequence, each inter-layer reference picture (ILRP) entry in a reference picture list of the current picture is marked as used for long-term reference.

In some embodiments, the reference picture list comprises a reference list 0 or a reference list 1. In some embodiments, each inter-layer reference picture (ILRP) entry in the reference picture list of the current picture is treated as a long-term reference picture in a decoding process. In some embodiments, the method is invoked once per picture in a decoding process for reference picture marking. In some embodiments, each inter-layer reference picture (ILRP) entry in the reference picture list is in a decoded picture buffer. In some embodiments, marking each ILRP entry as used for long-term reference replaces other markings that include unused for reference or used for short-term reference.

Figure 14:
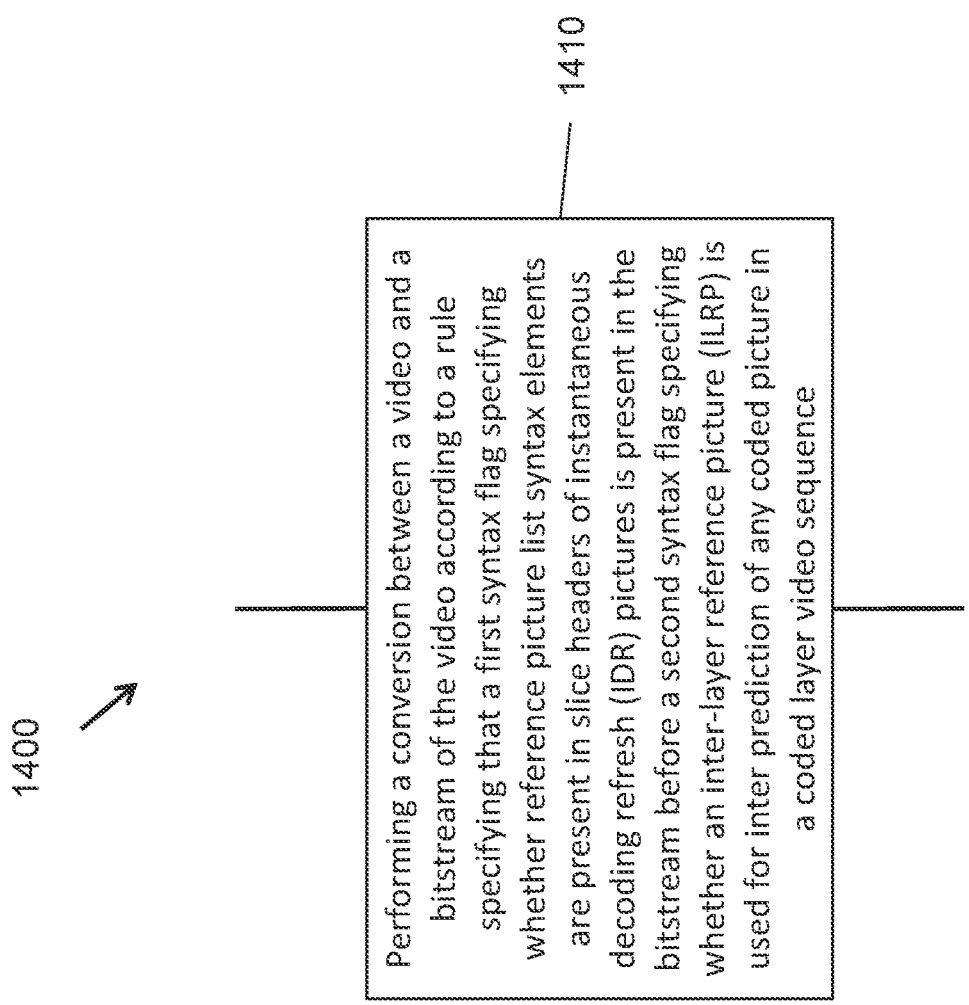
FIG. 14 is a flowchart representation of yet another method for video processing in accordance with one or more embodiments of the present disclosure.

FIG. 14 is a flowchart representation of a method 1400 of processing video data in accordance with one or more embodiments of the present disclosure. The method 1400 includes, at operation 1410, performing a conversion between a video and a bitstream of the video according to a rule. The rule specifies that a first syntax flag specifying whether reference picture list syntax elements are present in slice headers of instantaneous decoding refresh (IDR) pictures is present in the bitstream before a second syntax flag specifying whether an inter-layer reference picture (ILRP) is used for inter prediction of any coded picture in a coded layer video sequence.

In some embodiments, the rule further specifies that the second syntax flag is conditionally present in the bitstream according to the first syntax flag. In some embodiments, the second syntax flag is not present in the bitstream and is inferred to be 0 in case the first syntax flag is equal to 0. In some embodiments, the second syntax flag is not present in the bitstream and is inferred to be 0 in case the first syntax flag is equal to 0 and a layer does not use inter-layer prediction. In some embodiments, in case the first syntax flag is equal to 0, the second syntax flag is equal to 0 or a layer does not use inter-layer prediction. In some embodiments, whether the first syntax flag and/or the second syntax flag is present in the bitstream is based on a general constraint flag in a general constraint information syntax structure.

In some embodiments, the conversion comprises encoding the video into the bitstream. In some embodiments, the conversion comprises decoding the video from the bitstream.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field-programmable gate array (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electronically erasable programmable read-only memory (EEPROM), and flash memory devices; magnetic disks, e.g., internal hard disks or removable disks; magneto optical disks; and compact disc, read-only memory (CD-ROM) and digital versatile disc, read-only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of this disclosure. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

What is claimed is:

1. A method of processing video data, comprising:
performing a conversion between a video comprising a video picture comprising a slice and a bitstream of the video according to a first rule,
wherein the first rule specifies that a default value of a syntax element specifying a number of entries in a reference picture list syntax structure associated with a reference picture list (RPL) index is equal to 0 due to a condition being satisfied, and
wherein the condition is satisfied in case (1) the video picture is an instantaneous decoding refresh picture, (2) a first syntax flag specifies that RPL syntax elements are not present in a slice header of the slice, and (3) a second syntax flag specifies that RPL information is not present in a picture header of the video picture.

2. The method of claim 1, wherein a default value of a variable is equal to 0 in response to the condition being satisfied, and wherein the variable specifies a maximum reference index of an RPL for the conversion of the slice.

3. The method of claim 1, wherein a variable indicating a reference picture list index is equal to a number of reference picture lists syntax structures in a sequence parameter set in response to the condition being satisfied.

4. The method of claim 1, wherein the conversion is performed according to a second rule, and
wherein the second rule specifies that, responsive to the video picture being a starting picture of a coded layer video sequence, each inter-layer reference picture (ILRP) entry in a reference picture list of the video picture is marked as used for long-term reference.

5. The method of claim 4, wherein the reference picture list comprises a reference list 0 or a reference list 1.

6. The method of claim 4, wherein each ILRP entry in the reference picture list of the video picture is treated as a long-term reference picture in a decoding process.

7. The method of claim 4, wherein the method corresponding to the second rule is invoked once per picture in a decoding process for reference picture marking.

8. The method of claim 4, wherein each ILRP entry in the reference picture list is in a decoded picture buffer.

9. The method of claim 4, wherein marking each ILRP entry as used for long-term reference replaces other markings that include unused for reference or used for short-term reference.

10. The method of claim 1, wherein the conversion comprises encoding the video into the bitstream.

11. The method of claim 1, wherein the conversion comprises decoding the video from the bitstream.

12. An apparatus for processing video data comprising a processor and a non-transitory memory with instructions thereon, wherein the instructions upon execution by the processor, cause the processor to:
perform a conversion between a video comprising a video picture comprising a slice and a bitstream of the video according to a first rule,
wherein the first rule specifies that a default value of a syntax element specifying a number of entries in a reference picture list syntax structure associated with a reference picture list (RPL) index is equal to 0 due to a condition being satisfied, and
wherein the condition is satisfied in case (1) the video picture is an instantaneous decoding refresh picture, (2) a first syntax flag specifies that RPL syntax elements are not present in a slice header of the slice, and (3) a second syntax flag specifies that RPL information is not present in a picture header of the video picture.

13. The apparatus of claim 12, wherein a default value of a variable is equal to 0 in response to the condition being satisfied, and wherein the variable specifies a maximum reference index of an RPL for the conversion of the slice.

14. The apparatus of claim 12, wherein a variable indicating a reference picture list index is equal to a number of reference picture lists syntax structures in a sequence parameter set in response to the condition being satisfied.

15. The apparatus of claim 12, wherein the conversion is performed according to a second rule, and
wherein the second rule specifies that, responsive to the video picture being a starting picture of a coded layer video sequence, each inter-layer reference picture (ILRP) entry in a reference picture list of the video picture is marked as used for long-term reference.

16. The apparatus of claim 15, wherein the reference picture list comprises a reference list 0 or a reference list 1.

17. The apparatus of claim 15, wherein each ILRP entry in the reference picture list of the video picture is treated as a long-term reference picture in a decoding process.

18. The apparatus of claim 15, wherein the method corresponding to the second rule is invoked once per picture in a decoding process for reference picture marking.

19. A non-transitory computer-readable storage medium storing instructions that cause a processor to:
perform a conversion between a video comprising a video picture comprising a slice and a bitstream of the video according to a first rule,
wherein the first rule specifies that a default value of a syntax element specifying a number of entries in a reference picture list syntax structure associated with a reference picture list (RPL) index is equal to 0 due to a condition being satisfied, and
wherein the condition is satisfied in case (1) the video picture is an instantaneous decoding refresh picture, (2) a first syntax flag specifies that RPL syntax elements are not present in a slice header of the slice, and (3) a second syntax flag specifies that RPL information is not present in a picture header of the video picture.

20. A non-transitory computer-readable recording medium storing a bitstream of a video which is generated by a method performed by a video processing apparatus, wherein the method comprises:
generating a bitstream of a video according to a first rule, wherein the video comprising a video picture comprising a slice, wherein the first rule specifies that a default value of a syntax element specifying a number of entries in a reference picture list syntax structure associated with a reference picture list (RPL) index is equal to 0 due to a condition being satisfied, and wherein the condition is satisfied in case (1) the video picture is an instantaneous decoding refresh picture, (2) a first syntax flag specifies that RPL syntax elements are not present in a slice header of the slice, and (3) a second syntax flag specifies that RPL information is not present in a picture header of the video picture.

\* \* \* \* \*